Figures 6, 7:
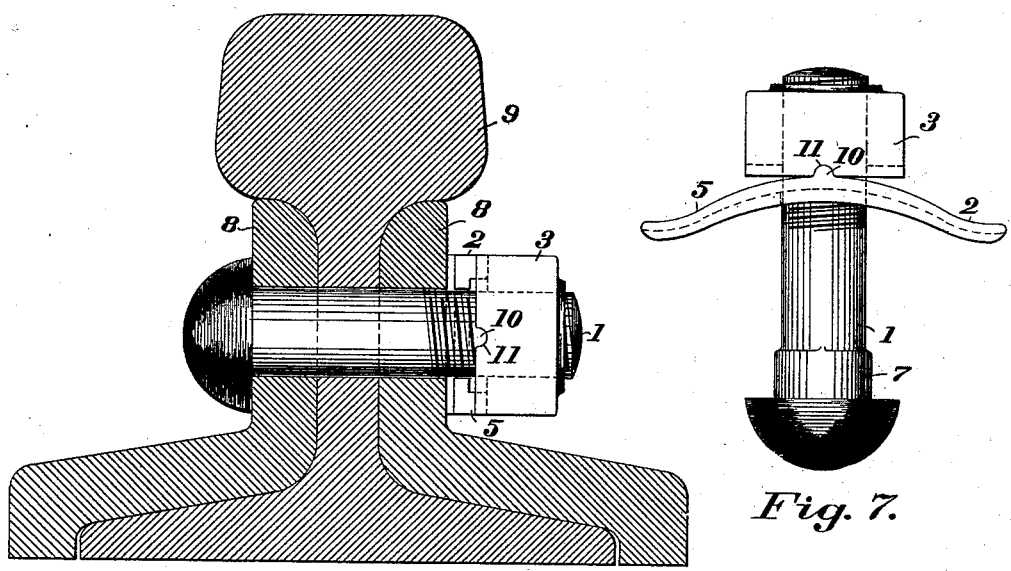

(No Model.) 2 Sheets—Sheet 1.
J. J. FRONHEISER.
NUT LOCK.
No. 495,198. Patented Apr. 11, 1893.
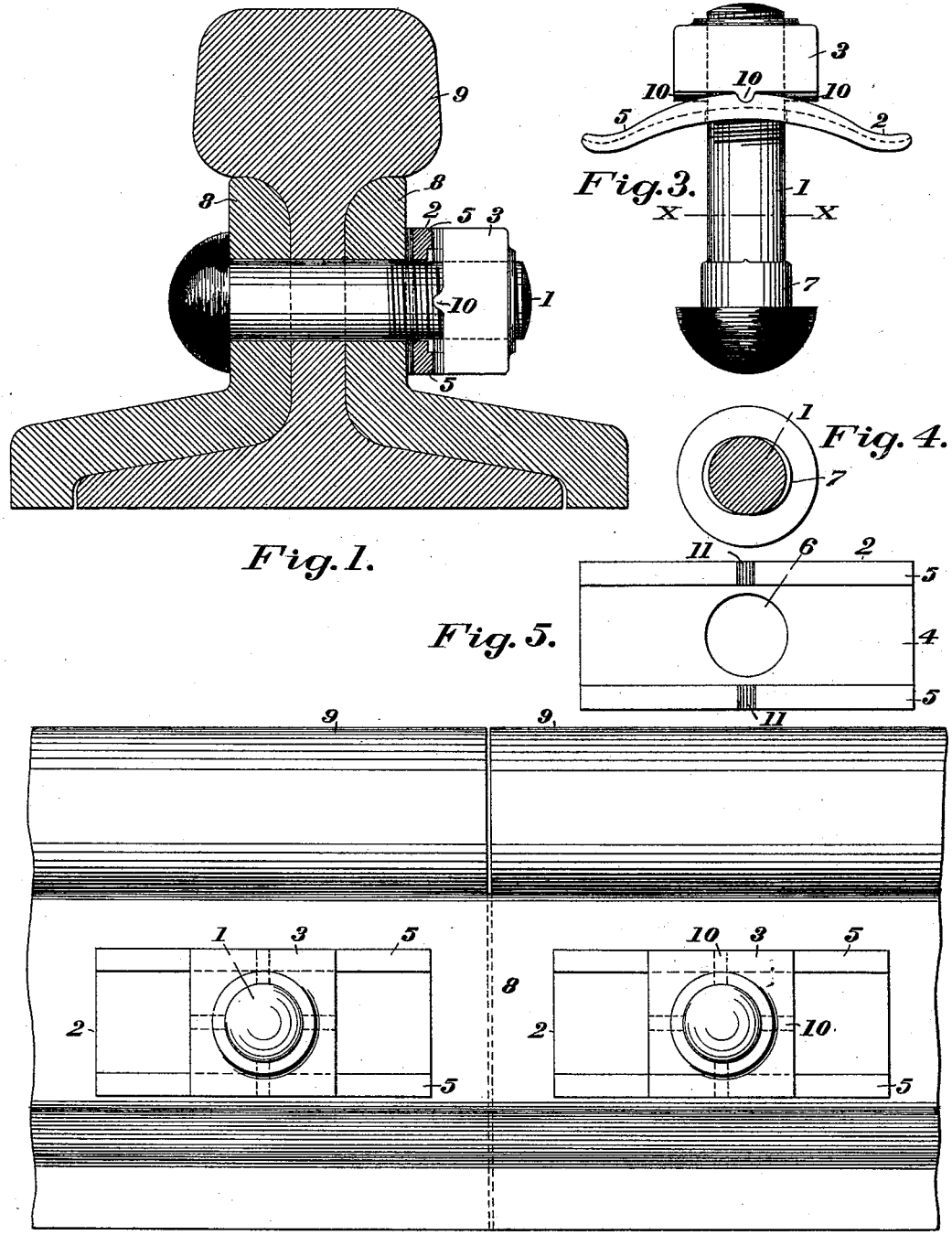
WITNESSES:
Hamilton E. Ford
H. H. Clayton
INVENTOR
James J. Fronheiser
BY E. W. Cady
ATTORNEY.

(No Model.) 2 Sheets—Sheet 2.

J. J. FRONHEISER.
NUT LOCK.

No. 495,198. Patented Apr. 11, 1893.

WITNESSES:
Hamilton E. Ford
H. H. Clayton

INVENTOR
James J. Fronheiser
BY
E. W. Cady
ATTORNEY.

UNITED STATES PATENT OFFICE.

JAMES J. FRONHEISER, OF JOHNSTOWN, PENNSYLVANIA.

NUT-LOCK.

SPECIFICATION forming part of Letters Patent No. 495,198, dated April 11, 1893.

Application filed May 16, 1892. Serial No. 433,229. (No model.)

*To all whom it may concern:*

Be it known that I, JAMES J. FRONHEISER, of Johnstown, in the county of Cambria and State of Pennsylvania, have invented a new and useful Nut-Lock, which invention is fully set forth and illustrated in the following specification and accompanying drawings.

The invention relates to that class of nut locks which have for their object, by means of a spring washer interposed between the nut on the bolt and the bolted structure and compressed by screwing up the nut, to prevent the latter from becoming unscrewed and loose, by the strain and jar upon the bolt and the wear of the surfaces adjacent thereto.

The object of the invention is stated in the title.

The invention consists of a nut lock and details thereof, as hereinafter described and claimed.

In the accompanying drawings, Figure 1, Sheet 1, shows a rail-road rail and splice bars in vertical cross-section, secured by a bolt and nut lock partly in cross-section constructed in accordance with this invention. Fig. 2 is a side elevation showing a rail joint with invention applied. Fig. 3 is a view of a track bolt with a nut and bowed spring plate thereon constructed in accordance with this invention. Fig. 4 is a vertical cross-section of the bolt, shown in Fig. 3, looking toward the head of the bolt. Fig. 5 is a plan view of the bowed spring plate on the side which is located next to the nut. Figs. 6, 7, Sheet 2, are views similar to those in Figs. 1 and 3, showing a modification of the invention.

Referring to Sheet 1 of drawings. 1 is a track bolt, 2 a flat bowed spring plate constructed in accordance with this invention and 3 the nut. The bowed spring plate 2 is made with a thin longitudinal portion 4, to render it light and flexible and with longitudinal ribs 5 to give it strength.

6 indicates the hole in the bowed spring plate for the passage of the bolt.

The bolt 1 is formed with an oval enlargement 7 adjacent to its head which fits into a corresponding recess in the adjacent splice bar and prevents the bolt from turning. Any form of bolt, however, may be employed.

In employing the invention, the bolt 1 is passed through bolt holes in splice bars 8 and the web of a rail 9, the bowed spring plate 2 is slipped over the projecting end of the bolt 1 against the adjacent splice bar 8 and the nut 3 screwed up sufficiently to compress the bowed spring plate and hold the nut by the resilient action of the bowed spring plate from becoming unscrewed.

To aid in preventing the nut from becoming unscrewed I have devised means for permitting the nut to turn on the bowed spring plate, in being screwed up and to automatically engage therewith when screwed up to place so as to prevent the nut from turning back on the bowed spring plate. I have shown for this purpose in Figs. 1, 2, 3 and 5, projections or lugs 10, on the inner face of the nut, of any desired number, though preferably four in practice, which are adapted to engage correspondingly shaped recesses 11 in the opposite edges of the bowed spring plate 2. In screwing up the nut 3, the projections 10 will be permitted to ride over the bowed spring plate and slip past the recesses 11, by reason of the yielding action of the bowed spring plate, until the bowed spring plate is sufficiently compressed to hold the nut, when the projections 10 are brought into engagement with the recesses 11.

In the modification shown in Figs. 6 and 7, Sheet 2, the nut is provided with the recesses 11 and the bowed spring plate with the projections 10, the result being the same.

By means of this invention a nut lock is provided which will effectually prevent the nut from becoming unscrewed.

The resilient action of the bowed spring plate will compensate for the wear of the surfaces from the strain and jarring action of the parts, by always holding the parts firmly together.

Having described my invention, I claim—

1. A nut lock consisting of a bolt in combination with a bowed spring plate having a bolt hole and longitudinal strengthening ribs, and a nut, the longitudinal strengthening ribs and the inner surface of the nut being provided with means as described for permitting the nut to be turned on the bowed spring plate, automatically engage the longitudinal ribs adjacent to the bolt hole and be held from turning.

2. In a nut lock, a bowed spring plate formed with a thin longitudinal central portion, a bolt hole therein, longitudinal strengthening ribs and recesses in the ribs adjacent to the bolt hole.

3. A nut lock, consisting of a bolt in combination with a bowed spring plate, formed with a bolt hole and longitudinal strengthening ribs with recesses in the ribs adjacent to the bolt hole, and a nut having projections adapted to ride over the spring and recesses in the ribs and to automatically engage the recesses to lock the nut.

In witness whereof I have affixed my signature in the presence of two witnesses.

JAMES J. FRONHEISER.

Witnesses:
WM. A. DONALDSON,
H. W. SMITH.